United States Patent
Chen et al.

(10) Patent No.: US 8,742,613 B2
(45) Date of Patent: Jun. 3, 2014

(54) WIND GENERATOR WITH WATER FLOAT SAIL

(75) Inventors: Hong Chen, Shenzhen (CN); Maohua Li, Beijing (CN)

(73) Assignee: Shenzhen Wind Water Wheel New Energy Technology Co., Ltd., Shenzhen, Guangdong Province (CN)

(*) Notice: Subject to any disclaimer, the term of this patent is extended or adjusted under 35 U.S.C. 154(b) by 239 days.

(21) Appl. No.: 13/503,364

(22) PCT Filed: May 18, 2010

(86) PCT No.: PCT/CN2010/072863
§ 371 (c)(1),
(2), (4) Date: Apr. 20, 2012

(87) PCT Pub. No.: WO2011/047546
PCT Pub. Date: Apr. 28, 2011

(65) Prior Publication Data
US 2012/0217755 A1  Aug. 30, 2012

(30) Foreign Application Priority Data
Oct. 22, 2009 (CN) .......................... 2009 1 0110692

(51) Int. Cl.
*F03D 3/00* (2006.01)
(52) U.S. Cl.
USPC ........................................................ 290/55
(58) Field of Classification Search
USPC .................................................. 290/54–55
See application file for complete search history.

(56) References Cited

U.S. PATENT DOCUMENTS

| | | | | |
|---|---|---|---|---|
| 7,220,096 B2* | 5/2007 | Tocher | | 415/1 |
| 7,948,101 B2* | 5/2011 | Burtch | | 290/44 |
| 8,217,526 B2* | 7/2012 | Devitt | | 290/55 |
| 2006/0012182 A1* | 1/2006 | McCoin | | 290/55 |
| 2006/0022470 A1* | 2/2006 | Johnson | | 290/54 |
| 2008/0018115 A1* | 1/2008 | Orlov | | 290/54 |
| 2008/0231053 A1* | 9/2008 | Burtch | | 290/52 |
| 2009/0129953 A1* | 5/2009 | Andersen | | 417/334 |
| 2010/0219645 A1* | 9/2010 | Yamamoto et al. | | 290/55 |
| 2010/0320766 A1* | 12/2010 | Klukowski | | 290/53 |
| 2011/0215650 A1* | 9/2011 | Slocum et al. | | 307/72 |
| 2011/0254275 A1* | 10/2011 | Joseph | | 290/53 |
| 2012/0211987 A1* | 8/2012 | Roe et al. | | 290/53 |

FOREIGN PATENT DOCUMENTS

| | | |
|---|---|---|
| CN | 1619142 A | 5/2005 |
| CN | 101363416 A | 2/2009 |
| CN | 101463797 A | 6/2009 |
| ES | 2003473 A | 11/1988 |

* cited by examiner

*Primary Examiner* — Truc Nguyen
(74) *Attorney, Agent, or Firm* — Cheng-Ju Chiang

(57) ABSTRACT

A wind generator with a water float sail includes a pond or a circular water tank containing liquid, a water float running system which can rotate in the pond or the circular water tank under the drive of wind and which includes a water float running platform floating on the liquid and several sails placed on the water float running platform, a location system which can locate the water float running system on the liquid surface, and make it rotate within a predetermined range, a brake system which can stop the rotation of the water float running system, and a generator system which can transform the energy produced by the water float running system into electric power output. The wind generator can make the water float running system floating on the liquid surface rotate, and it can generate electricity with low cost and high power.

11 Claims, 6 Drawing Sheets

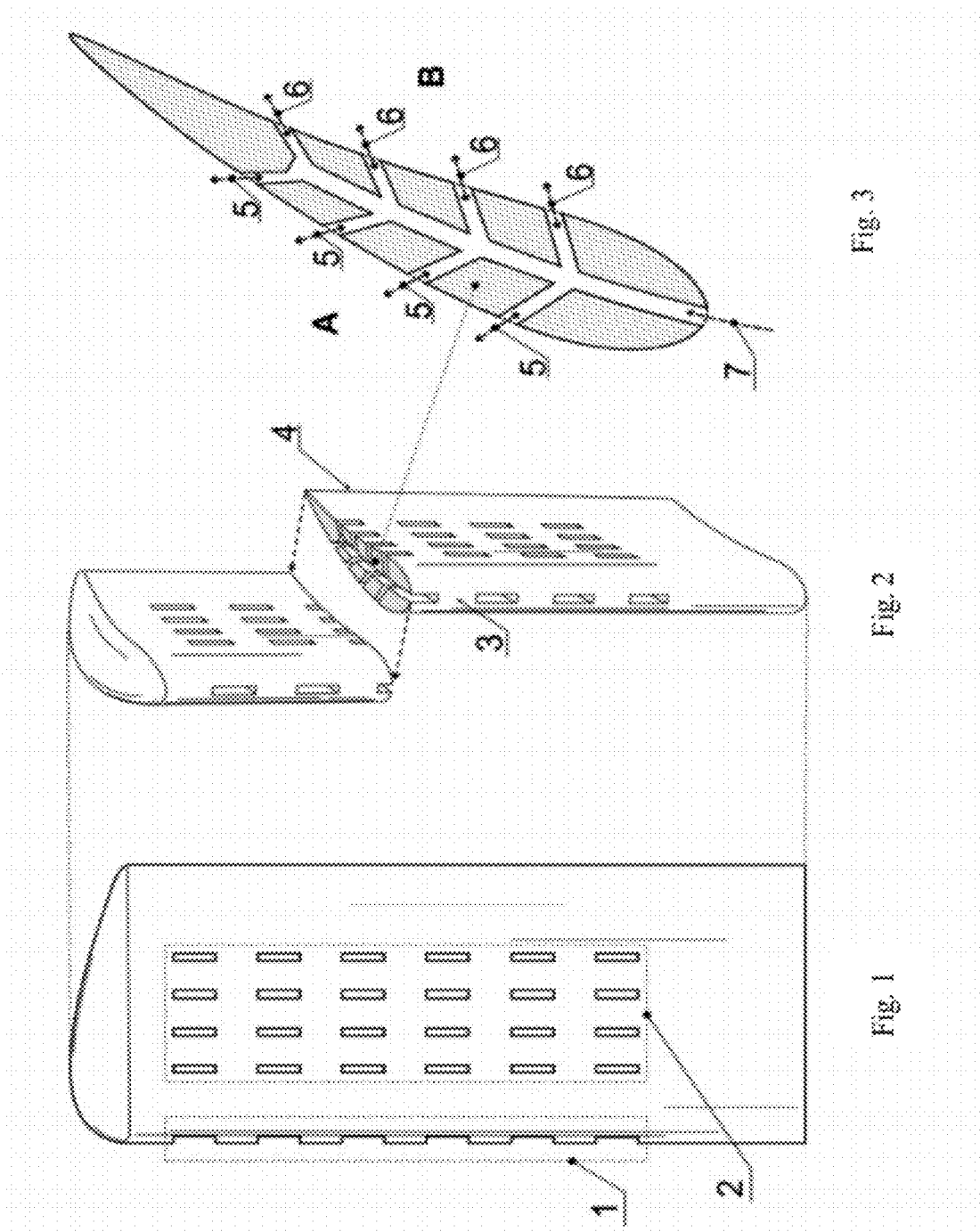

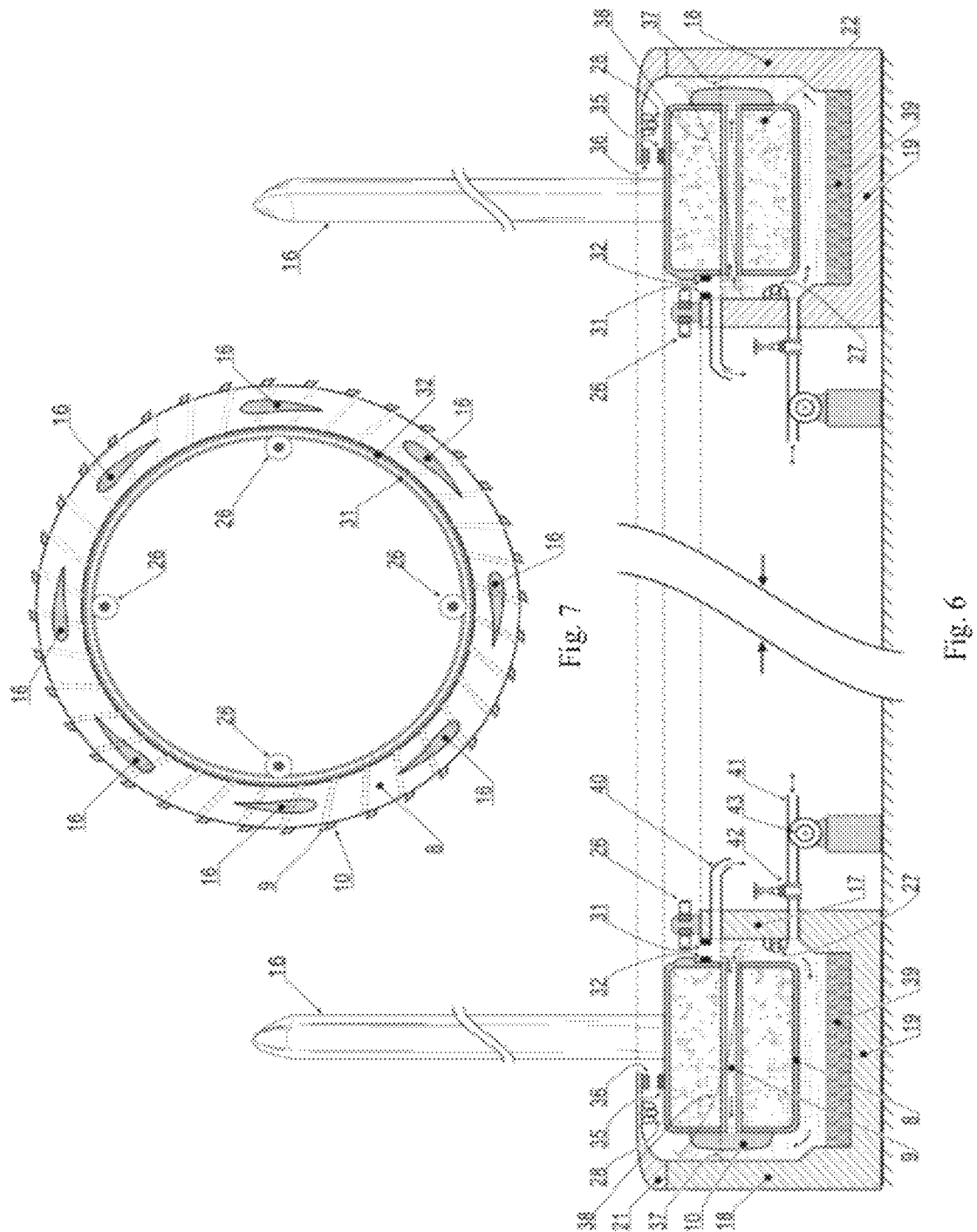

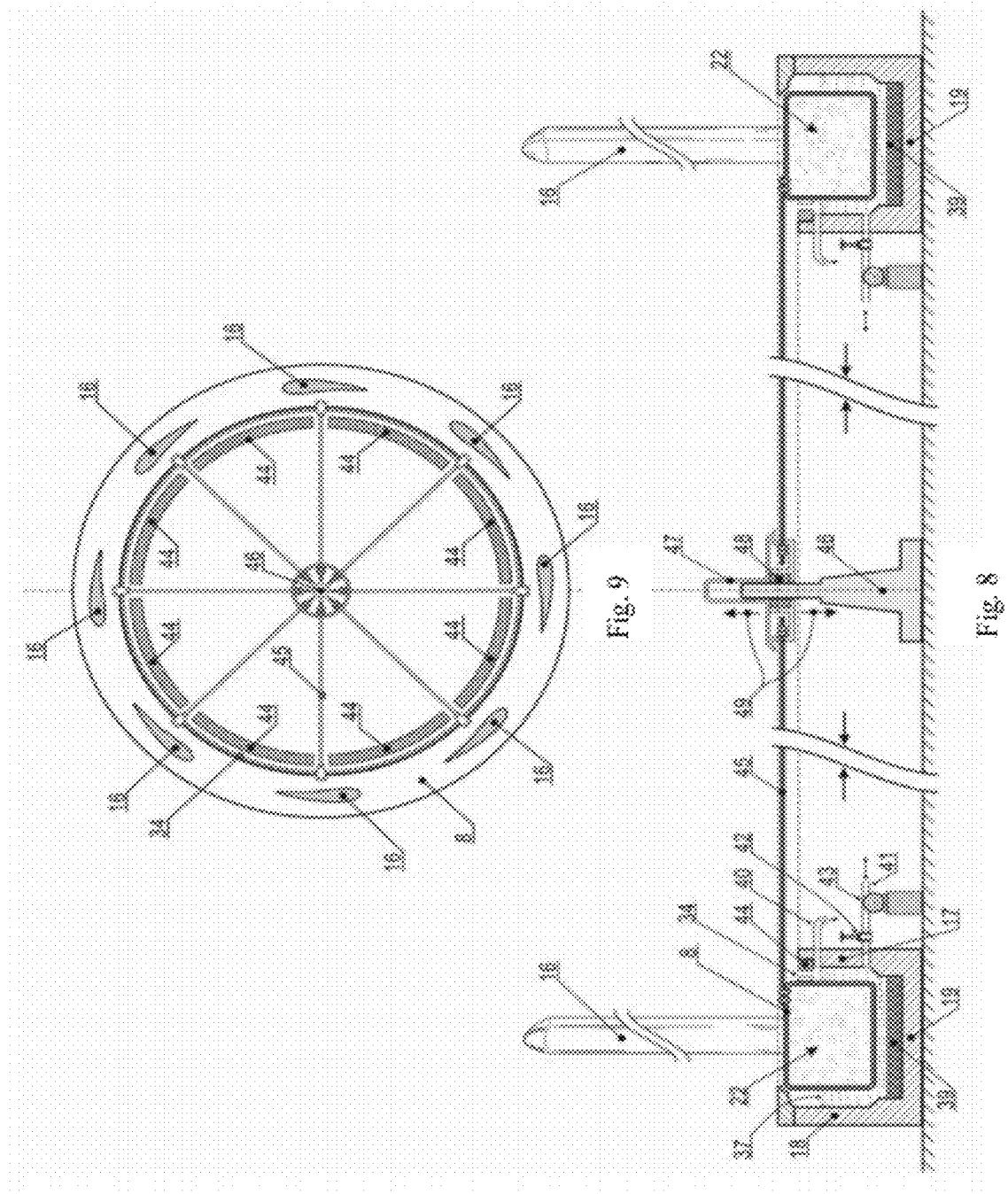

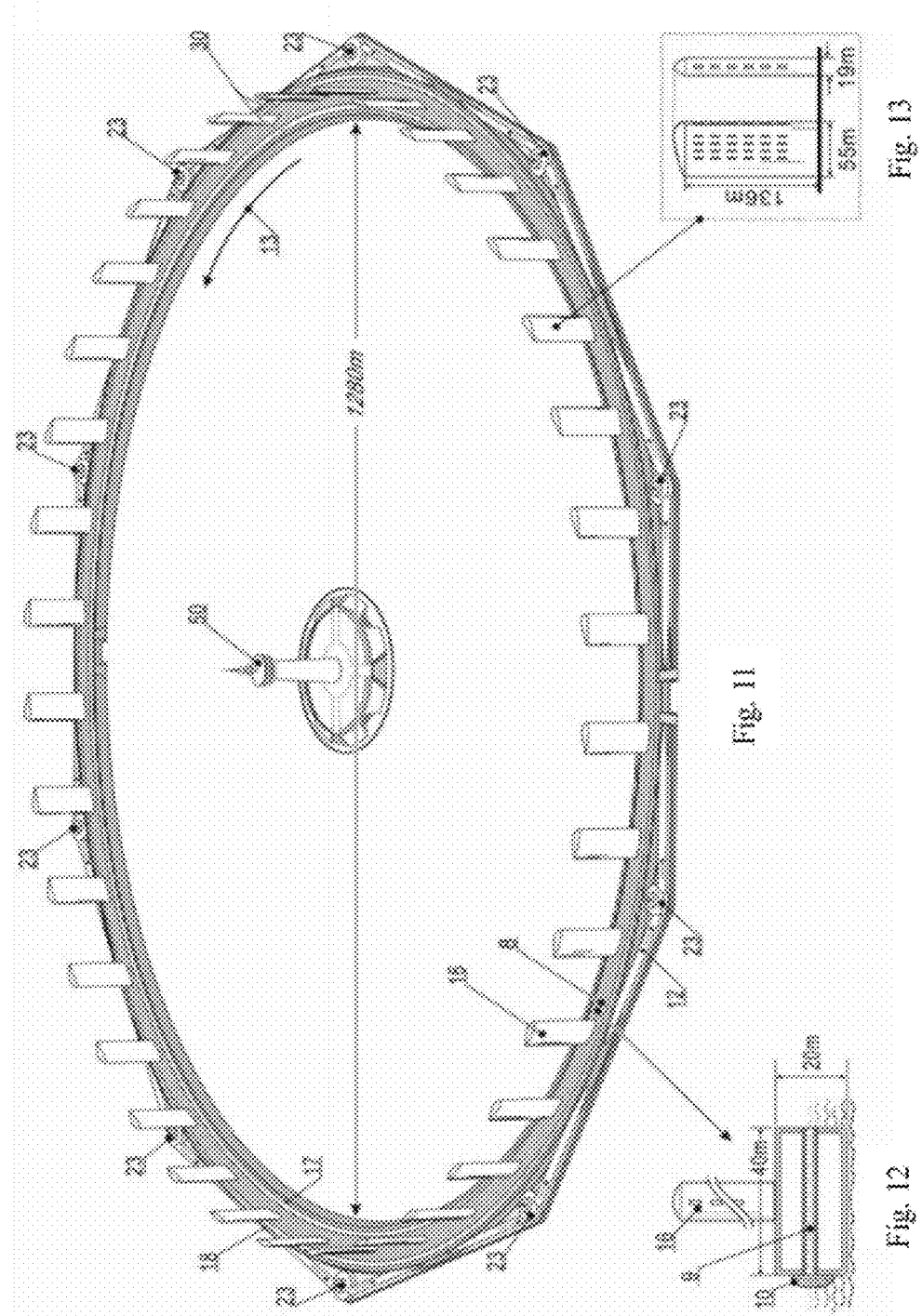

WIND GENERATOR WITH WATER FLOAT SAIL

CROSS REFERENCE TO RELATED APPLICATIONS

The present application is a 35 U.S.C. §371 National Phase conversion of International Patent Application No. PCT/CN2010/072863, filed on May 18, 2010, the disclosure of which is incorporated by reference herein. The PCT International Patent Application was published in Chinese.

FIELD OF THE INVENTION

The present invention relates to a wind generator with sails, more particularly to a wind generator with sails on the basis of a water float running system.

BACKGROUND OF THE INVENTION

At present, the mainstream wind generator widely used in the world still applies the principle of horizontal axis rotor wind turbine, wherein, only the limited wind area of the airfoil of wind wheel and the swept surface of the impeller can be utilized to capture wind energy. In order to improve the generation power of the wind generator, the effective diameter of the turbine blade is needed to be increased. In such case, though the effective generation power has been improved, it may bring a series of contradictions difficult to be solved, as shown in the following: (1) With the increase of the diameter of the turbine blade, the ratio of linear velocity at the tip of the turbine blade to wind velocity increases. Thus, the turbine blade would remain in a limiting operation condition for a long time. (2) For the whole structure, the whole weight of both of the huge wind wheel and the generator rotor of the wind generator concentrates on a horizontal axis high up in the heaven, forming a top-heavy physical structure that is not reasonable. It may bring a series of technological bottlenecks difficult to be solved about the design and the manufacture of the existed wind generator. It is a foregone conclusion that the unit capacity of the traditional wind generator is limited. (3) As the inherent physical structure defect in the traditional wind generator, seriously noise pollution may be produced during the wind generator running. In addition, a variety of ecological crisis in a three-dimension space may be produced due to the turbine blade rotating at high speed. As a result, the comprehensive social and economical benefits will be discounted.

SUMMARY OF THE INVENTION

The technical problem to be solved by the present invention is to provide a wind generator with water float sails in the light of the technological bottlenecks of limiting unit capacity, high manufacture and maintains cost, short service life and low wind energy utilization which are produced by the structure defects existing in the above wind generator.

In the present invention, the technical solution utilized to solve the technical problem is to construct a wind generator with water float sails, comprising a pond or a circular water tank containing liquid; a water float running system which can rotate in the pond or the circular water tank under the drive of wind and which includes a water float running platform (8) floating on the liquid and several sails (16) placed on the water float running platform; a location system which can locate the water float running system on the liquid surface of the pond or the circular water tank and make it rotate within a predetermined range; a brake system which can stop the rotation of the water float running system; and a generator system which can transform the energy produced by the water float running system into electric power output.

The wind generator with water float sails of the present invention has a structure advantage of "top-light". With the strong capability of capturing wind energy of the ramjet airfoil sail, the water float running system with huge weight and made of reinforced concrete may float on the liquid surface in the circular water tank and rotate to produce large and steady kinetic energy, so as to make the wind generator with water float sails with low manufacture cost, startup at low wind speed, run steadily, and with a high unit generation power.

In addition, the circular water tank cooperating with the water float running system may be widely configured to large water treatment engineering, an irrigation and water conservancy project, a scientific research base, an ecological agriculture sightseeing and traffic, a sightseeing district, so as to improve the comprehensive social and economical benefits produced by the wind generator with water float sails.

Of course, for the wind generator with water float sails in the present invention, especially for the small and medium wind generator with water float sails, the main structure especially the sails, the water float running platform can be made of metal, synthetic material of metal and not-metal, or non-metallic chemical synthetic materials.

BRIEF DESCRIPTION OF THE DRAWINGS

FIG. 1 is a schematic plane diagram of a ramjet airfoil sail of the wind generator with water float sails in the present invention;

FIG. 2 is a cross sectional perspective view of FIG. 1;

FIG. 3 is a cross sectional top view of FIG. 1;

FIG. 6 is a cross sectional perspective view of FIG. 4;

FIG. 7 is a partial top view of a water float running system and a location system with magnetic location cooperated with limiting wheels in FIG. 4;

FIG. 8 is a cross sectional view of an axis location system cooperated with a mechatronic direct-drive generator system according to an embodiment of the present invention;

FIG. 9 is a partial top view of the water float running system and the axis location system of the embodiment in FIG. 8;

FIG. 11 is a perspective diagram of the wind generator with water float sails with an ultra-super power of 1800 MW;

FIG. 12 is a cross sectional dimension view of the water float running system in FIG. 11;

FIG. 13 is a cross sectional dimension view of the ramjet airfoil sail in FIG. 11.

DETAILED DESCRIPTION OF THE PREFERRED EMBODIMENT

Figure 5:
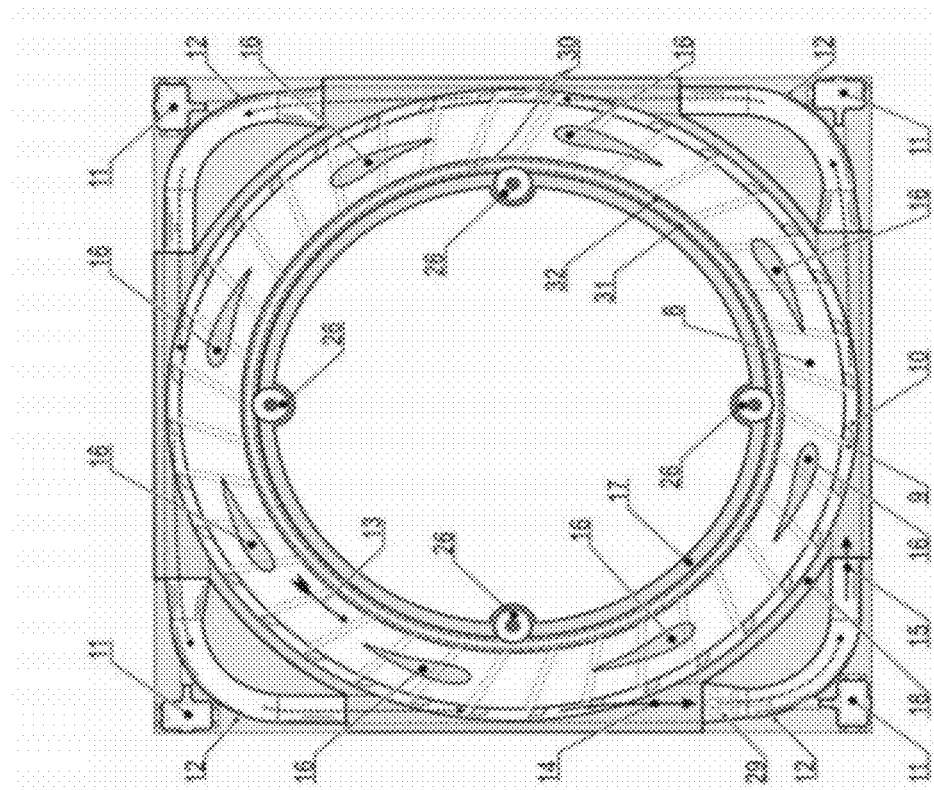
FIG. 5 is a top view of FIG. 4.

The wind generator with water float sails according to the present invention comprises five systems which including a pond or a circular water tank, a water float running system, a location system, a brake system, and a generator system. The structure, technical feature, working principle of the above systems of the wind generator with water float sails will be described in detail with reference to the accompanying drawings.

1. The Circular Water Tank of the Wind Generator with Water Float Sails

The pond or the circular water tank is the basic structure of the wind generator with water float sails. The pond or the circular water tank contains enough liquid to ensure the water float running system float on a proper functioning water level. The liquid in the pond or the circular water tank may be nature water, or other antifreezing chemical liquid with pollution-free and low viscosity.

As shown in FIGS. 4, 5, 6, 8, 10, the circular water tank may be constructed on the ground, the top of the building or floating on water. The circular water tank mainly comprises an inner circular retaining wall 17, an outer circular retaining wall 18, and a circular water tank bottom 19 which three surround together to form the circular water tank structure. The sealing head cover is arranged mainly according to the location system. In the embodiment shown in FIG. 10, a circular water tank inner sealing head cover 20 and a circular water tank outer sealing head cover 21 are respectively arranged on the top of the inner circular retaining wall 17 and the outer circular retaining wall 18. In the embodiment shown in FIG. 6, only the circular water tank outer sealing head cover 21 are arranged on the top of the outer circular retaining wall 18.

In addition, in some application, the inner circular retaining wall 17 may be canceled. Meanwhile, the above circular water tank may be replaced directly by a pond. However, in such case, it is hard to control the water level. Furthermore, when using the pond contain water, it is not convenient to implement a flexible location to the running system, such as a magnetic location cooperated with position by the limiting wheels and so on. As a result, it is difficult for the running system to guide the water in the pond into a honeycomb duct of a hydraulic turbine. Consequently, the axis location way is generally utilized and a mechatronic direct-drive PM generator is equipped when using the pond.

Figure 10:
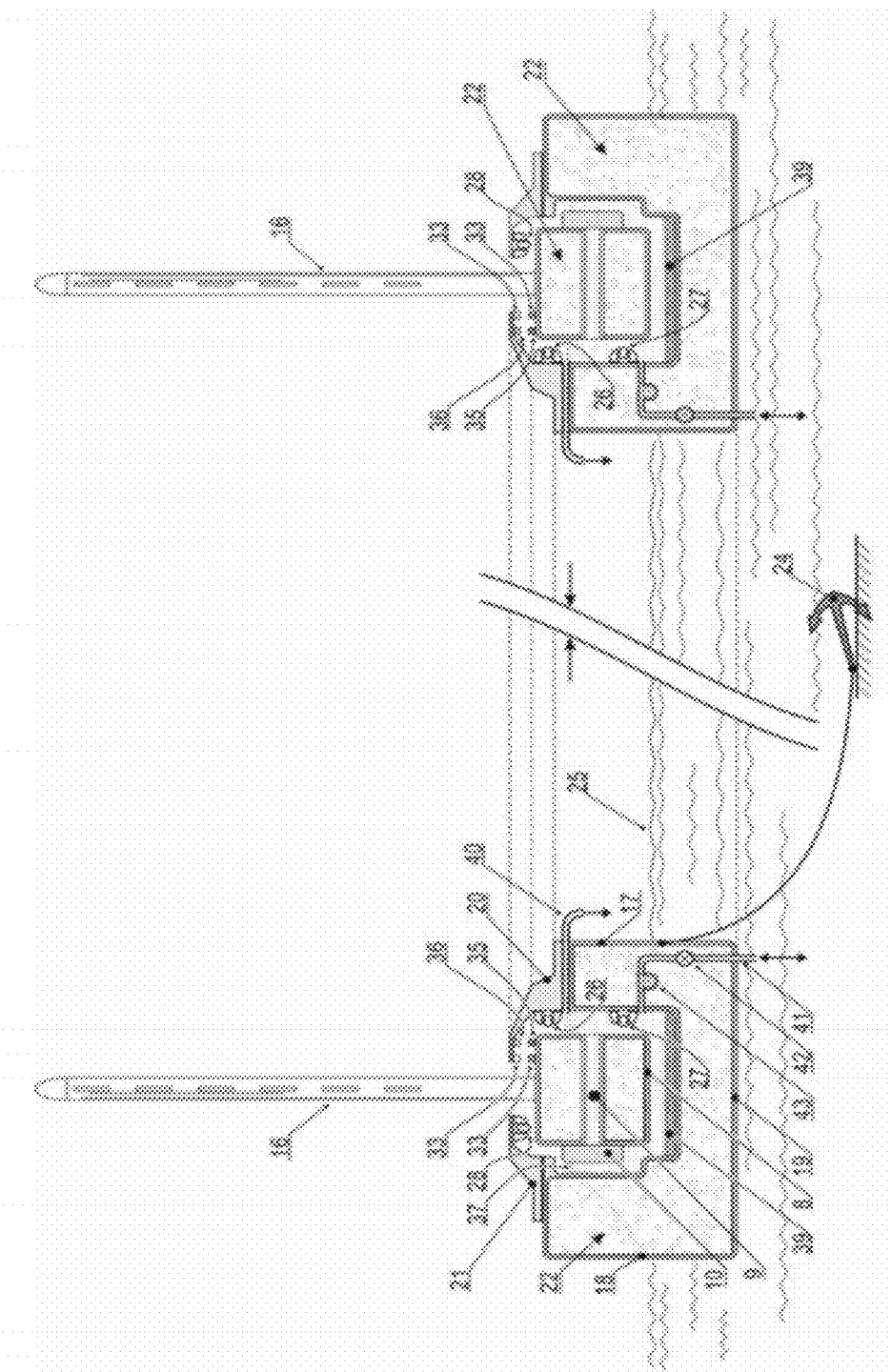
FIG. 10 is a cross sectional view of a water-float-type wind generator with water float sails of the wind generator with water float sails according to an embodiment of the present invention.

As shown in FIG. 10, in the embodiment where the wind generator with water float sails is floating on the water surface, the circular water tank is a water-suspended circular water tank with an inner cavity structure. A filler 22 may be put in the inner cavity of the water-suspended circular water tank, or the inner cavity may be empty. The filler 22 may be light and hard polyurethane foam, or be other materials with low cost, small specific gravity, high strength, small water absorption, good compression resistance performance.

As shown in FIGS. 6, 8, 10, a series of overflow pipes 40 are uniformly provided on the inner circular retaining wall 17 of the circular water tank. In implementation, the overflow pipes 40 may separately or together provided on the outer circular retaining wall 18. When the liquid level is too high, the liquid in the circular water tank may flow out via such overflow pipes 40, so as to prevent the liquid level too high to affect the location system and the generator system of the wind generator with water float sails.

In order to regulate the liquid level of the circular water tank, a series of water inlet and outlet pipes 41 are uniformly provided on the inner circular retaining wall 17 of the circular water tank. Furthermore, a water inlet and outlet valve 42 and a water inlet and outlet two-way pump 43 are provided on the water inlet and outlet pipes 41.

Instead, the above water inlet and outlet pipes 41 on the inner circular retaining wall 17 may separately or together provided on the outer circular retaining wall 18. In implementation, according to the fact, the water inlet and outlet pipes 41 may separately or together provided on other portions of the circular water tank, such as the circular water tank bottom 19. On condition that this will not impact on the normal operation of the water float running system, the water inlet and outlet pipes 41 may be inserted into the circular water tank from the circular water tank top.

The water inlet and outlet valve 42 provided on the water inlet and outlet pipes 41 may be switched manually or electric, or with dual mode of manual and electric. The water inlet and outlet pipes 41 provided with the water inlet and outlet valve 42 and the water inlet and outlet two-way pump 43 is equipment used to implement a grounding-type braking on the water float running system. It is known from the followed description that the water inlet and outlet pipe 41 is used as a water inlet pipe during watering, and as a water outlet pipe during braking.

As shown in FIG. 5, a water channel space 30 is provided between the water float running system and the inner circular retaining wall 17 of the circular water tank, and a water channel space 30 is also provided between the water float running system and the outer circular retaining wall 18 of the circular water tank.

A water line 37 shown in FIGS. 6 and 8 represents the water level of the circular water tank under stationary state. When the water float running system is under rotary running state, the circular water tank is with a water level 38 shown in FIG. 6 in such a motion state where the inner diameter is low and the outer diameter is high.

2. The Water Float Running System of the Wind Generator with Water Float Sails

In the embodiment shown in FIGS. 1-13, the water float running system of the wind generator with water float sails comprises a water float running platform 8 and several ramjet airfoil sails 16.

The water float running system is floating on the water in the pond or the circular water tank. The water float running platform 8 can move in a circle in the horizontal direction by the ramjet airfoil sails 16 capturing wind, which are uniformly arranged on the water float running platform 8. As such, the water float running system is an important supporter for the wind generator with water float sails to realize the conversion from wind energy to electric energy, and is a core system of the present invention.

The water float running platform 8 is a floater and presented as a circular inner cavity structure, which is one part of the water float running platform and used as a base platform carrier to support the ramjet airfoil sails 16 and so on. As shown in FIGS. 5 and 7, in order to cooperate with a hydro-generator equipment, a series of hydro-blades 10 are uniformly arranged on the side of the water float running platform 8. Meanwhile, in order to balance the waterflow in the circular water tank and eliminate the cyclotron eddy resistance which is applied on the rear part of the hydro-blades 10 when the water float running platform 8 is rotating, a series of waterflow pipes 9 penetrating the water float running platform 8 may be provided on the rear part of each of the hydro-blades 10.

As shown in FIGS. 6, 8, 10, in order to improve the structure strength of the floater of the water float running platform, to improve the reliability of rotary motion of the water float running system and to prevent the hollow cavity be damaged by accident to cause devastating effect, a filler 22 may be put in the inner cavity of the water float running platform 8, similar to the circular water tank floating on the water.

The ramjet airfoil sails 16 arranged on the water float running platform 8 are used to capture wind energy. As shown in FIGS. 1, 2, 3, each of the ramjet airfoil sails 16 comprises a sail head 3, a sail tail 4, a head gas inlet channel group 1 provided at the sail head 3, an airfoil gas channel group 2 respectively provided at the two airfoils of the sail. Wherein, the head gas inlet channel group 1 comprises a series of gas inlet 7 arranged on the sail head 3. And the airfoil gas channel group 2 comprises a series of airfoil multipolar gas openings 5, 6 respectively provided at the two airfoils of the sail. The above gas inlet 7 and airfoil multipolar gas openings 5, 6 form a jet gas channel inside the ramjet airfoil sails 16, as shown in FIG. 3.

The sail with traditional airfoil structure has a good performance of capturing wind, but there is a disadvantage that it can not overcome the frontal drag. However, the ramjet airfoil sail not only has an advantage that it has a large surface to capture wind, but also can reduce the frontal drag effectively and make the composite force of the resistance drive the sail head 3 moving forward so that enhancing the capacity of capturing wind. As shown in FIG. 3, when airflow presses the ramjet airfoil sails from the face A of the sails, a high pressure region is formed in the face A, and a low pressure region is formed in the face B correspondingly. As a result, there is a large pressure difference between the faces A and B. One part of the airflow at the high pressure region in the face A is diverged by the guiding of the airfoil of the face A, and the other part is directly enter the airfoil multipolar gas openings 5. The airfoil multipolar gas openings 6 of the face B presenting as low pressure region may absorb the airflow from the high pressure region of the airfoil multipolar gas openings 5 of the face A, and simultaneously siphon the airflow from the gas inlet 7 of the sail head 3. The absorbed and siphoned airflow may eject from the airfoil multipolar gas openings 6 of the face B presenting as low pressure region, so as to improve the composite force driving the ramjet airfoil sails move toward the sail head 3, which may drive the water float running system move in a horizontal circle toward the sail head 3, and vice versa for the action principle of natural wind pressing on the ramjet airfoil sails 16 from the face B. In the circular motion in a variety of directions, the ramjet airfoil sails 16 uniformly arranged on the water float running platform 8 may be applied a composite force to be driven forward at different angle of attack with respect to wind.

For the selection of the sail structure of the wind generator with water float sails, the above ramjet airfoil sails may be selected, or the traditional soft or hard airfoil sail without a ram air jet opening, or the traditional foldable sail with the angle of attack with respect to wind controlled by a computer.

For the design of the direction of the horizontal rotation of the wind generator with water float sails, based on the coriolis force produced by the rotation of the earth, when the wind generator with water float sails is applied in the Northern Hemisphere, the sail head 3 is set in front of the sail tail 4 along the counterclockwise direction so as to make the wind generator rotate in the counterclockwise direction 13 shown in FIGS. 5 and 11 under the drive of natural wind; and vice versa for the application in the Southern Hemisphere. As a result, the horizontal rotation of the wind generator is conformed to the "coriolis force" effect to realize rotation under calm air, furthermore to improve the efficiency of the horizontal rotation and to make the wind generator with water float sails start at an extremely low wind speed and run with high efficiency.

3. The Location System of the Wind Generator with Water Float Sails

The location system of the wind generator with water float sails is used to effectively locate the rotation of the water float running system floating in the water float tank, so as to improve the stable running reliability of the wind generator with water float sails and reduce the running resistance of the water float running system. Meanwhile, the location system also can reduce the construction cost of the wind generator significantly.

Generally there are two kinds of location system of the wind generator with water float sails: a magnetic location cooperated with position by limiting wheels and an axis location. Of course, in actual application, other kinds of location ways can also be applied, such as a location only by limiting wheels, or a mechanical rail location and so on.

[1] The Magnetic Location Cooperated with Position by Limiting Wheels

In the magnetic location cooperated with position by limiting wheels, the location system comprises one set or several sets of magnetic locating rails combined with a series of limiting wheels.

In the magnetic location, the location system comprises one set or several sets of stator magnetic locating rails and one set or several sets of rotator magnetic locating rails arranged on the water float running platform 8 corresponding to the stator magnetic locating rails; wherein, the stator magnetic locating rails are arranged at one position or several positions respectively selected from the following position groups: the inner side of the inner circular retaining wall 17 of the circular water tank, the inner side of the outer circular retaining wall 18 (herein the circular water tank is used a reference, and the respective side of the inner circular retaining wall 17 and the outer circular retaining wall 18, which is surrounding to form a water tank, is defined as the inner side), the lower side of the inner sealing head cover 20, and the lower side of the outer sealing head cover 21.

The magnetic location is classified into permanent magnetic location and electromagnetic location.

The basic principle of the permanent magnetic location applied on the water float running system will be described as followed and with reference to the accompanying drawings.

The permanent magnetic location is generally classified into permanent magnetic repulsion location, permanent magnetic suction location, permanent magnetic location with combination of repulsion and suction.

(1) Permanent Magnetic Repulsion Location

As shown in FIGS. 6 and 7, in the permanent magnetic repulsion location, the location system comprises a stator permanent magnetic repulsion locating rail 31 and a rotator permanent magnetic repulsion locating rail 32 corresponding thereto. Wherein, the stator permanent magnetic repulsion locating rail 31 is arranged on the inner circular retaining wall 17, and the rotator permanent magnetic repulsion locating rail 32 is arranged on the side of the water float running platform 8 which is close to the inner circular retaining wall 17.

The stator permanent magnetic repulsion locating rail 31 may be respectively or together arranged on the outer circular retaining wall 18. And the rotator permanent magnetic repulsion locating rail 32 may be arranged on the water float running platform 8 and be corresponding to the stator permanent magnetic repulsion locating rail 31.

The location system where the stator permanent magnetic repulsion locating rail 31 is arranged on the retaining wall is preferred for the permanent magnetic repulsion locating rail.

The location system may comprise one set or several sets of stator permanent magnetic repulsion locating rail 31 and one set or several sets of rotator permanent magnetic repulsion locating rail 32 respectively. The permanent magnetic materials utilized in the above stator permanent magnetic repulsion locating rail 31 and rotator permanent magnetic repulsion locating rail 32 respectively are correspondingly with the same magnetic pole.

(2) Permanent Magnetic Suction Location

As shown in FIG. 10, in the permanent magnetic suction location, the location system comprises permanent magnetic suction locating rails 33 respectively and correspondingly arranged on the upper part of the water float running platform 8 and the lower part of the circular water tank inner sealing head cover 20.

The permanent magnetic suction locating rails 33 may also be respectively and correspondingly arranged on the upper part of the water float running platform 8 and the lower part of the circular water tank outer sealing head cover 21.

For the permanent magnetic suction locating rails 33, it is preferred that one of the permanent magnetic suction locating rails 33 described above is fixed on the lower part of the circular water tank sealing head cover.

The location system may comprises one set or several sets of the permanent magnetic suction locating rails 33 which are arranged correspondingly. And the permanent magnetic materials utilized in the permanent magnetic suction locating rails 33 are correspondingly with the opposite magnetic pole.

(3) Permanent Magnetic Location with Combination of Repulsion and Suction

Based on the locating principle of the permanent magnetic repulsion location system and the permanent magnetic suction location system described above, both a permanent magnetic repulsion location system and a permanent magnetic suction location system may be provided on the wind generator with water float sails, so as to form a strengthened combination of permanent magnetic force location to implement a more effective location on the water float running system.

As the permanent magnetic force location is a flexible location, it has low locating precise. And such way is generally properly for the location in such a case where the wind generator is running with wind at a normal speed (that is, with wind at such speed, in the permanent magnetic force location, the produced permanent magnetic force can locate the water float running system in the middle of the circular water tank and the water float running system can rotate with respect to a normal position).

In the case with wind at a abnormal speed (that is, with wind at such speed, in the permanent magnetic force location, the produced permanent magnetic force can not locate the water float running system in the middle of the circular water tank and the water float running system can not rotate around a normal position), in order to ensure the regular operation of the water float running system of the wind generator with water float sails, and to prevent horizontal drift and horizontal inclination during the water float running system is running, several limiting wheels may be provided to implement a rigid mechanical location on the water float running system.

The location system with the limiting wheel comprises a series of upper limiting wheels 26 and lower limiting wheels 27 on one or more position of the inner circular retaining wall 17, the outer circular retaining wall 18 and the water float running platform 8, and/or a series of top limiting wheels 28 on one or more position of the lower side of the inner sealing head cover 20, the lower side of the outer sealing head cover 21 and the upper side of the water float running platform 8. Each series of limiting wheels comprise three or more than three limiting wheels which are configured dependent on the mounting sit, quantity and mounting method.

The lower limiting wheels 27 and even several lines of lower limiting wheels 27 are arranged beneath the upper limiting wheels 26 and opposite to them respectively, so as to increase the positive stop range of transverse drift to the water float running system and ensure the wind generator with water float sails can run safely, reliably and steadily in all kinds of abominable weather conditions. Whilst, it is also can needed to realize safe baking of the wind generator with water float sails that the lower limiting wheels 27 are arranged below the upper limiting wheels 26. During braking, the water level may be decreased with water discharging, and the vertical position of the water float running platform 8 is lowered accordingly. With water discharging, the water float running system is still running and the upper limiting wheels 26 have lost the positive to limit the water float running system. In such a situation, the lower limiting wheels 27 arranged below the upper positive limiting wheels 26 and just opposite to them respectively are needed to implement positive limiting, so as to ensure safe braking of the wind generator with water float sails.

For a miniature wind generator with water float sails which center of gravity is relative high and horizontal stability is poor, and a wind generator with water float sails floating on water which is required to have a good performance of anti-turbulence, a series of top limiting wheels 28 are necessary to be arranged on the lower side of the inner sealing head cover 20 and/or on the lower side of the outer sealing head cover 21, so as to implement rigid positive limiting to the horizontal inclination in a certain range of the water float running system.

As shown in FIG. 6, 7, 10, when the ramjet airfoil sails 16 are impacted by normal natural wind, the ramjet airfoil sails 16 will capture wind and consequently drive the water float running system move in a horizontal circle which is floating in the circular water tank. Meanwhile, by the natural wind, the water float running system will also drift horizontally along with the natural wind. However, with the flexible clamping of the magnetic location system, the water float running system will be located in the middle of the circular water tank and rotate steadily with respect to a normal position. At this time, the upper limiting wheels 26, lower limiting wheels 27 and the top limiting wheels 28 are all in an idle state.

When the impact of the nature wind exceeds the limit of capacity of the permanence magnetic force produced by the magnetic locating rails, the water float running system rotating in the circular water tank will break the fetter of the permanence magnetic force and drift along with the natural wind, or even be inclined horizontally. With the flexible clamping of the magnetic location system, the water float running system will soft land on the upper limiting wheels 26, the lower limiting wheels 27 and the top limiting wheels 28 mounting on the lower side of the sealing head cover of the circular water tank, and drive the upper limiting wheels 26, the lower limiting wheels 27 and the top limiting wheels 28 rotation with the water float running system. As such, the water float running system will be defined to rotate steadily at a normal position in the circular water tank, so as to realize a rigid location to the horizontal drift and inclination in a certain range of the water float running system.

When the natural wind returns to be at a normal speed, with the flexible clamping of the magnetic location system, the water float running system which is rotating will drift back to the middle of the circular water tank and rotate steadily with respect to a normal position. At this time, the upper limiting wheels 26, lower limiting wheels 27 and the top limiting wheels 28 are all in an idle state.

When the above three kinds of permanent magnetic force locations cooperated with limiting wheels are applied to implement location on the water float running platform, in order to cope with the harsh weather and further ensure the water float running system of the wind generator with water float sails can run steadily, an electromagnetic suction compensation location in the electromagnetic location is also applied to strength the location of the water float running system.

In the electromagnetic suction compensation location, the excess electric power produced by the wind generator with water float sails with wind at an abnormal speed is supplied directly to the electromagnetic induction coil to produce a large electromagnetic force, so as to implement an electromagnetic suction compensation location in real time and based on sections to the horizontal inclination in every direction of the water float running system under the control of an electric controller.

As shown in FIGS. 6 and 10, the electromagnetic suction compensation location system comprises an electromagnetic suction compensation location coil rail 36 arranged at the lower side of the outer sealing head cover 21 or the inner sealing head cover 20 of the circular water tank, a special purpose compensation location steel rail 35 which is arranged on the water float running platform 8 and corresponding to the arranged electromagnetic suction compensation location coil rail 36, and an electric controller.

The above electromagnetic suction compensation location coil rails 36 may be together or respectively arranged at the lower side of the circular water tank outer sealing head cover 21. The special purpose compensation location steel rails 35 are arranged on the water float running platform 8 and just opposite to the electromagnetic suction compensation location coil rails 36 respectively.

For the electromagnetic suction compensation location which is used to strength the location for the horizontal inclination of the water float running system, it is preferred that the electromagnetic suction compensation location coil rails 36 are arranged at the lower side of the circular water tank sealing head cover.

In the case where the water float running system is running steadily with natural wind at a normal speed, the electric controller does not identify the signal indicating the inclination of the water float running system. The electromagnetic suction compensation location is in an idle state. Only the permanent magnetic force location system can maintain location operation with wind at a normal speed. FIG. 6 shows the system of the location maintained by the permanent magnetic repulsion location system with wind at a normal speed. FIG. 10 shows the system the location maintained by the permanent magnetic suction location system with wind at a normal speed.

When wind force action exceeds the bearing load of the magnetic force produced by the permanent magnetic force location system, the water float running system may be in a state of acceleration rotation. At this time, the water float running system may not only horizontally drift along with the wind, but also be horizontally inclined at a certain section even with the action of the top limiting wheels 28. At this time, an electric sensor thereupon sends a signal indicating that some section of the water float running system is horizontally inclined. Meanwhile the electromagnetic suction compensation location coil rail 36 controlling such section may produce a strong electromagnetic suction to attract the special purpose compensation location steel rail 35, so as to make the water float running system return to the normal position. As a result, a balance compensation location for the horizontal inclination of the water float running system is accomplished.

The electromagnetic suction compensation location for the water float running system in real time and based on sections is usually designed for small and medium-sized wind generator with water float sails, and especially for wind generator with water float sails floating on water, which are with poor running stability. For large-sized wind generator with water float sails with a relative low center of gravity and better running stability, the electromagnetic suction compensation location device is not necessary.

For the magnetic force location cooperated with limiting wheels, there are many selection for the wind generator with water float sails. In actual operation, which kind of location is selected for the wind generator with water float sails to ensure its running stability is dependent on the diameter of the water float running platform, the area and the number of the sails, the ratio of the height of the sail to the diameter of the water float running platform, output power of the wind generator with water float sails, the construction materials and the combination thereof and the like.

[2] The Axis Location

As shown in FIGS. 8 and 9, in the axis location system, one ends of several locating axis connection rods 45 is interlinked to a locating axis 46 provided at the center of a circle of the circular water tank by a locating axis bearing 48 respectively, and the other ends are fixed on the water float running platform 8 uniformly. The locating axis 46 is provided with a locating axis protective cover 47. The axis location system is presented as radial form taking the locating axis 46 as the center and then locates the water float running system at the normal position which is in the middle of the circular water tank. This is a rigid mechanical locating way with high precision for the wind generator with water float sails. It is also can reduce the construction cost of the wind generator with water float sails to utilize the axis location.

When the water level in the circular water tank is changed, the water float running system will move up and down in the normal extent of an axle sleeve system up and down move travel 49 along with the axis location system.

The axis location is mostly operable to small and medium wind generator with water float sails. Though the locating axis 46, the locating axis connection rods 45 and the locating axis bearing 48 in the axis location system are not required to bear the weight of the water float running system, with the increase of the diameter of the water float running platform, the radius span of the locating axis connection rods 45 may increase correspondingly. This will bring unconquerable technical obstacles for the design of the bearing capability and the stability of a construction of the locating axis 46, the locating axis connection rods 45 and the locating axis bearing 48. Furthermore, a higher request is bring up for the selection of materials. As a result, it may further increase the construction cost.

In the implementation of the axis location, the inner circular retaining wall 17 of the circular water tank may be eliminated, and consequently the circular water tank is instead with a pond structure. The above locating axis connection rods may be made of rigid materials, or of mooring rope and the like.

4. A Flexible Grounding-Type Braking System of the Wind Generator with Water Float Sails As shown in FIG. 6, 8, 10, the flexible grounding-type braking system of the wind generator with water float sails comprises a water inlet and outlet valve 42 and an outlet two-way pump 43 both mounted on the water inlet and outlet pipes 41, and the sand stone 39 only used in grounding-type braking which is bedding on a large area of the circular water tank bottom 19.

When it is needed to implement baking to the wind generator with water float sails, the water inlet and outlet valve 42 and an outlet two-way pump 43 mounted on the water inlet and outlet pipes 41 are both switched to drain, consequently the liquid in the circular water tank is discharged gradually, so as to make the water float running system be not acted upon by the buoyancy and stably ground on the sand stone 39 which is bedding on a large area of the circular water tank bottom 19 to stop operation by grounding-type braking. By adjusting and controlling the water discharging speed properly, it is freely to control the grounding-type braking speed of the water float running system. As a result, the braking of the massive water float running system is very safe and reliable. During braking, as the water float running system is slowly to ground on the spongy sand stone 39 with a large area, a large flexible frictional resistance will be produced to implement an effective and stable grounding-type braking to the water float running system and avoid the structural damage of the bottom of the water float running platform 8 which may be produced in the rigid braking.

Conversely, the water inlet and outlet valve 42 and an outlet two-way pump 43 mounted on the water inlet and outlet pipes 41 are both switched to fill, liquid is filled into the circular water tank to a normal working water level. The grounded water float running system is floating again which may start and rotate under the driven of wind.

5. A Mating Generator System of the Wind Generator with Water Float Sails

The mating generator system of the wind generator with water float sails generally may be a hydro-generator system or a mechatronic direct-drive PM generator system.

[1] A Mating Hydro-Generator System

In the wind generator with water float sails, the mating hydro-generator system can transform the water energy produce by the water float running system capturing wind into electric power output. As such, in such generating method, the wind generator with water float sails realizes transforming the wind energy into the water energy and meanwhile transforming the water energy into electric power output.

Figure 4:
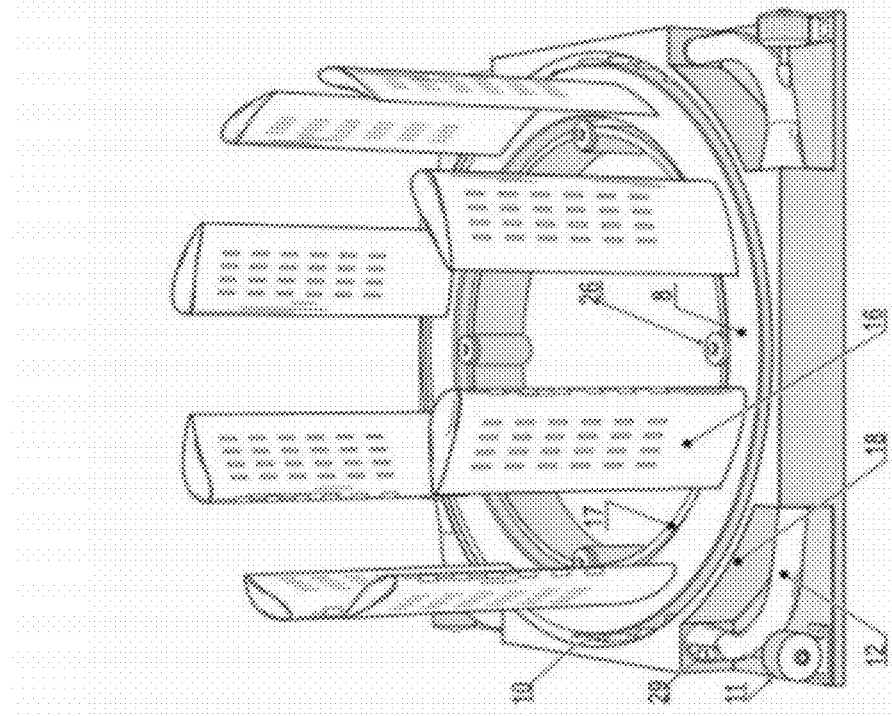
FIG. 4 is a perspective diagram of a magnetic location system cooperated with a hydro-generator system in the wind generator with water float sails according to an embodiment of the present invention.

As shown in FIGS. 4, 5, 11, the mating hydro-generator 23 comprises a generator 11, a hydraulic turbine honeycomb duct 12 and a hydraulic turbine blade 29 coaxial with the generator 11.

The number and single machine capability of the mating hydro-generator 23 of the hydro-generator system cooperated with the wind generator with water float sails are respectively dependent on the diameter of the water float running platform 8, the area of the ramjet airfoil sails 16, and the output power of the wind generator with water float sails.

[2] A Mating Mechatronic Generator System

In the wind generator with water float sails, the mating mechatronic generator system can transform the wind energy into electric power output.

As shown in FIGS. 8 and 9, the mating mechatronic generator system comprises a permanent magnetic rail 34 only used in the generator which is mounted on the inner rim of the water float running platform 8, a generator stator coil winding 44 corresponding to the permanent magnetic rail 34 which is mounted on the inner circular retaining wall 17 of the circular water tank.

The above permanent magnetic rail 34 only used in the generator which is mounted on the inner rim of the water float running platform 8, and the generator stator coil winding 44 corresponding to the permanent magnetic rail 34 which is mounted on the inner circular retaining wall 17 may be correspondingly mounted on the outer rim of the water float running platform 8 and the outer circular retaining wall 18 respectively.

The certain application of the preferred embodiment of the wind generator with water float sails in the present invention will be illustrated with reference to the four kinds of the implementations of the drawings.

1. The Application of the Wind Generator with Water Float Sails Mated with a Hydro-Generator System As shown in FIGS. 4, 5, 6, and 7, a strengthened location with a combined-type magnetic location cooperated with limiting wheels is utilized in the wind generator with water float sails mated with a hydro-generator system which is applied in the Northern Hemisphere. The running direction is counter-clockwise.

The combined-type magnetic location comprises a permanent magnetic repulsion location rail and an electromagnetic suction compensation rail which two are combined together. Wherein, the permanent magnetic repulsion location rail is consisted of a stator permanent magnetic repulsion location rail 31 arranged on the inner circular retaining wall 17 and the rotator permanent magnetic repulsion location rail 32 corresponding thereto which are arranged on the water float running platform 8, so as to implement location to the wind generator with water float sails with wind at a normal speed.

The electromagnetic suction compensation rail is consisted of an electromagnetic suction compensation location coil rail 36 mounted at the lower side of the circular water tank outer sealing head cover 21, and a corresponding special purpose compensation location steel rails 35 mounted on the water float running platform 8. In the positive stopway mated with the magnetic location system, the limiting wheels comprises upper limiting wheels 26 and lower limiting wheels 27 mounted on the inner circular retaining wall 17, and top limiting wheels 28 mounted at the lower side of the outer sealing head cover 21. The electromagnetic suction compensation location combined with the limiting wheel system can implement a strengthened and combined location for the horizontal displacement and horizontal inclination of the water float running system.

The generation process of the wind generator with water float sails mated with the hydro-generator system will be described as followed.

Turn on the water inlet and outlet valve 42 and the outlet two-way pump 43 provided on the water inlet and outlet pipes 41 to pour water into the circular water tank to a normal work water level where the water float running system can float up. Such that the water float running system in the circular water tank can be floating up in the water of the circular water tank.

With wind at a normal speed, the ramjet airfoil sails 16 uniformly arranged on the water float running platform 8 captures wind so as to drive the water float running system rotate in the counterclockwise direction 13. Under the action of the permanent magnetic repulsion location system, the water float running system can rotate at a relative normal position in the middle of the circular water tank. Meanwhile, by means of the hydro-blades 10 on the outer rim of the water float running platform 8, the water in the circular water tank also rotate in the counterclockwise direction 13 with the water float running system. The rotary water rushes in the direction 14 to the hydraulic turbine honeycomb duct 12 linked to the circular water tank, and then drive the hydraulic turbine blade 29 to rotate, so as to drive the generator 11 to generate synchronously. The waterflow rushing to the hydraulic turbine honeycomb duct 12 flows out from the hydraulic turbine honeycomb duct 12 in the direction 15 and join to the water in the circular water tank to circulate together. In the process above, the wind generator with water floats sail can transform wind energy into water energy, and simultaneously transform water energy into electric power output.

With the wind speed up to an abnormal speed, the permanent magnetic repulsion produced by the permanent magnetic repulsion location system can not limit the water float running system to rotate at a relative normal position in the middle of the circular water tank. When the water float running system comes up to horizontally drift, by means of the flexible clamping of the permanent magnetic repulsion produced by the permanent magnetic location system, the water float running system will soft land on the upper limiting wheels 26 and the lower limiting wheels 27, and then drive the upper limiting wheels 26 and the lower limiting wheels 27 rotate synchronously. As a result, the water float running system is rigidly limited to rotate at a relative normal position in the middle of the circular water tank. When the water float running system comes up to horizontally drift and be horizontally inclined as well, by means of the flexible clamping of the permanent magnetic repulsion, the water float running system will be against the top limiting wheels 28 mounting on the lower side of the sealing head cover. Meanwhile, when the electric controller identifies the horizontal inclination in this section, the electric controller would control the electromagnetic suction compensation location coil rail 36 in such section to produce a strong electromagnetic suction to attract the special purpose compensation location steel rail 35. As a result, the water float running system can return to stably rotate at a normal horizontal position, so as to ensure the wind generator with water float sails can run normally.

When it is needed to implement braking to the wind generator with water float sails, turn on the water inlet and outlet valve 42 and the outlet two-way pump 43 provided on the water inlet and outlet pipes 41 to discharge the water from the circular water tank gradually, so as to make the water float running platform in running is not under the action of buoyancy, and then slowly grounds on the special purpose sand stone 39 which is bedding on a large area of the circular water tank bottom 19. Consequently, the generator system stops working and a safety and flexible grounding-type braking for the water float running system of the wind generator with water float sails is finished.

A traditional cross flow hydro-generator may be utilized in the mating hydro-generator 23, of which the hydraulic turbine blade may be fixed-type or rotary-type. The arrangement of the hydro-generator may be full cross flow or semi cross flow. The energy conversion efficient of such cross flow hydro-generator is about more than 90%, even more than 94%. As such, this kind of low head hydro-generator is particularly suitable for the present implementation solution.

Of course, in the wind generator with water float sails mated with a hydro-generator system, according to the practical application, a mating axis location system, a dependent limiting wheel location system, mechanical rail location system and so on may be provided to locate the water float running system, and to implement the hydraulic turbine generation mode of the wind generator with water float sails.

2. The Application of the Wind Generator with Water Float Sails Mated with a Mechatronic Generator System The wind generator with water float sails mated with a mechatronic generator system can realize the mechatronic direct-drive generation. It is suitable for the wind generator with water float sails to mate with a mechatronic generator system, especially for the small and medium wind generator with water float sails, with advantages of high conversion efficiency and low construction cost.

As shown in FIGS. 8 and 9, the axis location system is presented as radial form taking the locating axis 46 as the center and then locates the water float running system at the normal position which is in the middle of the circular water tank. Under the action of the wind, the ramjet airfoil sail 16 drives the water float running system rotate with the wind.

The permanent magnetic rail 34 only used in the generator which is mounted on the inner rim of the water float running platform 8 may produce the moving magnetic lines during rotating synchronously with the water float running system. Correspondingly, the generator stator coil winding 44 fixed on the inner circular retaining wall 17 cuts the moving magnetic lines produced by the permanent magnetic rail 34 to produce electric current. As a result, the mechatronic direct-drive generation is realized.

In such implementation, an axis location system with high precision is directly utilized in the location, which is facilitated to directly arrange a mating mechatronic direct-drive generation system in the wind generator with water float sails so as to reduce cost substantially.

Of course, in the wind generator with water float sails mated with a mechatronic direct-drive generation system, a magnetic location cooperated with the limiting wheel system, a dependent limiting wheel system, a mechanical location rail location and so on may be utilized for the water float running system. As the mechatronic direct-drive generation system requires the water float running system with high precision, and the precision of the magnetic location cooperated with the limiting wheel system is lower than that of the axis location, the magnetic location cooperated with the limiting wheel system is not very suitable for the mechatronic direct-drive generation system. As a result, when the mechatronic direct-drive generation system is utilized, the axis location would be generally utilized to implement location to the wind generator with water float sails.

3. The Wind Generator with Water Float Sails Applied in the Water

The wind generator with water float sails applied in the water in the present invention not only can be constructed on land and on the top of the buildings, but also can be constructed floating in the water of the river, lake and ocean. When applied in the water, there are two kinds of implementation modes which are the water-float-type and the fixed-pile-type wind generator with water float sails respectively.

[1] The Water-Float-Type Wind Generator with Water Float Sails

FIG. 10 is a cross sectional view of a water-float-type wind generator with water float sails of the wind generator with water float sails according to an embodiment of the present invention. The main technical features different from the wind generator with water float sails applied on land are described as following: the circular water tank is a water-float-type circular water tank which is floating on the water surface 25. There is an inner cavity structure in the water-float-type circular water tank which is filled with filler 22. In order to ensure the water-float-type circular water tank can be floating in the water to a certain extent, more than three underwater mooring anchors 24 are provided to hold it.

In the present solution, the underwater mooring anchors 24 may be movable.

As the water-float-type circular water tank is floating in the water, during the running of the water float running system, the water-float-type circular water tank may pitch up and down under the action of the wave, and the horizontal rotary movement is very unstable with the impact of the wave. However, when the diameter of the water-float-type circular water tank is far larger than the wavelength of the wave, the impact of the pitch produced by the wave on the water-float-type circular water tank will be counteracted. As such, the implementation solution is usually suitable for large and medium or ultra large water-float-type wind generator with water float sails.

The water float running system of the water-float-type wind generator with water float sails may move in a horizontal circle in a certain direction under the action of the natural wind, and then drive the water in the water-float-type circular water tank rotate synchronously. The massive water float running system in rotary movement itself will also produce a strong gyroscopic effect, which will further improve the anti-strong-wave-pitch capability of the water-float-type wind generator with water float sails.

As the wind generator with water float sails utilizing the axis location is generally only suitable for the small and medium-sized wind generator, in order to improve the anti-typhoon capability of the water-float-type wind generator with water float sails, a strengthened location with a combined-type magnetic location cooperated with the limiting wheel system is utilized.

As shown in FIG. 10, in the present implementation solution, a mating hydro-generator system is utilized.

In order to further improve the anti-wave capability and improve the stability of the water-float-type wind generator with water float sails, in the design of the combined-type magnetic location cooperated with the limiting wheel system, several kinds of magnetic force location cooperated with the limiting wheel system are combined together to form the location.

In the present solution, the magnetic location system is a permanent magnetic suction location system comprising permanent magnetic suction locating rails 33 respectively and correspondingly arranged on the upper part of the water float running platform 8 and the lower part of the circular water tank outer sealing head cover 21, so as to implement permanent magnetic suction location to the water float running system with the wind at a normal speed. And the first set of electromagnetic suction location system is consisted of a special purpose compensation location steel rail 35 arranged on the water float running platform 8 and an electromagnetic suction compensation location coil rail 36 corresponding thereto which is arranged at the lower side of the inner sealing head cover 20. In the first set of electromagnetic suction location system, the excess electric power produced by the wind generator with water float sails with wind at an abnormal speed is supplied directly to the electromagnetic suction compensation location coil rail 36 to produce a large electromagnetic suction, so as to implement an strong electromagnetic suction compensation location in real time and based on sections to the horizontal inclination in every direction of the water float running system under the control of an electric controller. Meanwhile, cooperated with the limiting wheel system consisted of the upper limiting wheel 26 and the lower limiting wheel 27 mounted on the inner circular retaining wall 17, and the top limiting wheel 28 mounted at the lower side of the outer sealing head cover 21, the electromagnetic suction compensation location system can implement a strengthened and combined location for the horizontal displacement and horizontal inclination of the water-float-type wind generator with water float sails in mighty wind and great waves.

In order to better struggle against atrocious weather, the top limiting wheel 28 provided at the lower side of the outer sealing head cover 21 may be eliminated. Alternatively, the electromagnetic suction compensation location coil rail 36 and the special purpose compensation location steel rail 35 may be respectively and correspondingly mounted at the lower side of the circular water tank outer sealing head cover 21 and on the water float running platform 8 to form the second set of strong electromagnetic suction location system. When the second set of strong electromagnetic suction location system is cooperated with the first set of electromagnetic suction location system, the excess electric power produced by the wind generator with water float sails with wind at an abnormal speed is supplied directly to the electromagnetic suction compensation location coil rail 36 to produce a large electromagnetic suction, so as to strengthen the location in basis of time and sections to the horizontal inclination in every direction of the water float running system under the control of an electric controller.

The basic principle related to the permanent magnetic repulsion location system, the electromagnetic suction compensation location system, and the limiting wheel has been described in detail. It is unnecessary to go into details.

[2] The Fixed-Pile-Type Wind Generator with Water Float Sails

In a shallow water of the river and lake and in the offshore areas, several pile foundations may be constructed directed on the water bottom to upbear the circular water tank, so as to form a fixed wind generator with water float sails.

For the fixed-pile-type wind generator with water float sails, a mating hydro-generator system or a mechatronic direct-drive generation system may be utilized as the mating generator system; a magnetic location cooperated with the limiting wheel system, an axis location system, a dependent positive stop by a limiting wheel system or a mechanical location rail may be utilized as the location. The structure design and the generating principle is the same as that of the wind generator with water float sails described above. It is unnecessary to go into details.

4. The Wind Generator with Water Float Sails with Ultra-Super Power

With the wind generator with water float sails having the structural advantages of "top light" and low center of gravity, the bottleneck that the unit capacity of the traditional wind generator is limited will be eliminated by technical design and manufacturing process. The generator with the capacity of 1000 MW can be realized easily, and the unit construction cost is smaller than that of the small and medium wind generator with water float sails.

Although the technology related to the certain implementation of the ultra-super power wind generator with water float sails is very complex and still in the rough, there is no technical bottleneck. The basic structure, generating principle, location principle and so on is similar to that of the wind generator with water float sails described above. The data only with respect to the wind generator with water float sails with ultra-super power will be described as followed.

[1] The Main Structural Data with Respect to the Present Implementation Solution In the wind generator with water float sails with an ultra-super power of 1800 MW shown in FIGS. 11, 12 and 13, a strengthened and combined magnetic location cooperated with the limiting wheel system is utilized for the water float running system with an ultra large diameter. 36 ramjet airfoil sails are provided on the water float running platform 8. The mating hydro-generating set with an ultra-super power of 1800 MW is consisted of 10 mating hydro-generators 23 with unit capacity of 180 MW. A wind central control tower 50 is provided at the center of the wind generator with water float sails.

The water float running platform 8 is designed to with a diameter of 1280 m, a circumference of 4021 m, a width of 40 m and a height of 20 m. And the ramjet airfoil sails 16 is designed to with a height of 136 m, a width of 55 m, a thickness of 19 m, and the space between sails of 56.70 m.

[2] The Illustration of Buoyancy with Respect to the Ultra Large Water Float Magnetic Location Running System As shown in FIG. 11, ⅔ of the working displacement of the water float running platform 8 with dimensions set by above data is 2.14 million tons. It is known by estimation that, the total weight of the ramjet airfoil sails 16 with dimensions set by above data which is made of reinforced concrete is about 0.61 million tons, and the total weight of the water float running platform 8 with dimensions set by above data and with an inner cavity is about 1.20 million tons. As a result, the total weight of the water float running system is about 1.81 million tons which is far smaller than the ⅔ of the working displacement of 2.14 million tons. As such, under the action of the wind, the massive water float running system of the wind generator with water float sails is capable of floating in the circular water tank and rotating stably at the ⅔ working waterline.

As stated above, only the advantage embodiment of the present invention is described, and the scope of the present invention is not limited to this. It should be understood by the skills in the art that any modifications or equivalent replacement made in the spirit of scope of the present invention should be included in the scope of the appended claims of the present invention. Therefore, the scope of the present invention should be in claims.

What is claimed is:

1. A wind generator with water float sails, comprising a pond or a circular water tank containing liquid; a water float running system which can rotate in the liquid in the pond or the circular water tank under the drive of wind, wherein, the water float running system comprises a water float running platform floating on the liquid and several sails placed on the water float running platform; a location system which can locate the water float running system on the liquid surface, and make it rotate within a predetermined range; a brake system which can stop the rotation of the water float running system; and a generator system which can transform the energy produced by the water float running system into electric power output.

2. The wind generator with water float sails of claim 1, wherein, the circular water tank is constructed on the ground or on the top of the building or floating on water; and the circular water tank comprises an inner circular retaining wall, an outer circular retaining wall, and a circular water tank bottom, several overflow pipes are provided on the inner circular retaining wall and/or on the outer circular retaining wall through which the excess liquid in the circular water tank is discharged.

3. The wind generator with water float sails of claim 2, wherein, several water inlet and outlet pipes are provided on the circular water tank for pouring or discharging liquid; the bake system comprises a water inlet and outlet valve and a water inlet and outlet two-way pump provided on the water inlet and outlet pipes, and sand stone only used in the brake system which is bedding on the bottom of the circular water tank.

4. The wind generator with water float sails of claim 3, wherein, the circular water tank further comprises a circular water tank inner sealing head cover arranged on the top of the inner circular retaining wall, and/or a circular water tank outer sealing head cover arranged on the top of the outer circular retaining wall; the location system comprises one set or more sets of stator magnetic force location rails arranged at one or more position of the inner side of the inner circular retaining wall, the inner side of the outer circular retaining wall, the lower side of the inner sealing head cover, and the lower side of the outer sealing head cover, and one set or more sets of rotator magnetic force location rails arranged on the water float running platform and corresponding to the stator magnetic force location rails.

5. The wind generator with water float sails of claim 2, wherein, the location system comprises several limiting wheels arranged at one or more position of the inner side of the inner circular retaining wall, the inner side of the outer circular retaining wall, the lower side of the inner sealing head cover, the lower side of the outer sealing head cover, and the water float running platform.

6. The wind generator with water float sails of claim 1, wherein, the location system comprises a locating axis provided at the center of a circle of the pond or the circular water tank, a locating axis bearing interlinked to the locating axis, and several locating axis connection rods with one end linked to the locating axis bearing and the other end fixed on the water float running platform uniformly.

7. The wind generator with water float sails of claim 1, wherein, the sails are ramjet airfoil sails comprising a head gas inlet channel group provided at a sail head thereof and an airfoil gas channel group respectively provided at two airfoils thereof; wherein, the head gas inlet channel group comprises several gas inlets, and the airfoil gas channel group comprises several airfoil multipolar gas openings respectively provided at the two airfoils of the sail; the several gas inlets and airfoil multipolar gas openings form a jet gas channel inside the sail.

8. The wind generator with water float sails of claim 1, wherein, the generator system comprises a generator, a hydraulic turbine honeycomb duct linked to the circular water tank, and a hydraulic turbine blade which is arranged inside the hydraulic turbine honeycomb duct and used for driving the generator to run; several hydro-blades are provided on the side of the water float running platform for introducing the liquid in the circular water tank into the hydraulic turbine honeycomb duct.

9. The wind generator with water float sails of claim 8, wherein, on the water float running platform, a series of waterflow pipes are provided on the rear part of each of the hydro-blades and penetrating the inner side and the outer side of the water float running platform.

10. The wind generator with water float sails of claim 1, wherein, the generator system comprises one or more set of permanent magnetic rails only used in the generator provided at the inner side of the water float running platform and/or at the outer side of the water float running platform, and one or more set of generator stator coil windings corresponding to the permanent magnetic rail which is provided on the circular water tank.

11. The wind generator with water float sails of claim 4, wherein, the location system comprises several limiting wheels arranged at one or more position of the inner side of the inner circular retaining wall, the inner side of the outer circular retaining wall, the lower side of the inner sealing head cover, the lower side of the outer sealing head cover, and the water float running platform.

* * * * *